Oct. 15, 1963 B. E. KEVELIN 3,107,190
METHOD OF DIELECTRICALLY EMBOSSING A METALLIC
ELEMENT TO A THERMOPLASTIC
Filed March 20, 1961 2 Sheets-Sheet 1

INVENTOR.
Bruce E. Kevelin
BY
Paul J. Ethington
ATTORNEY

INVENTOR.
Bruce E. Kevelin
BY
Paul J. Ethington
ATTORNEY

United States Patent Office 3,107,190
Patented Oct. 15, 1963

3,107,190
METHOD OF DIELECTRICALLY EMBOSSING A METALLIC ELEMENT TO A THERMOPLASTIC
Bruce E. Kevelin, Warren, Mich., assignor to General Motors Corporation, Detroit, Mich., a corporation of Delaware
Filed Mar. 20, 1961, Ser. No. 96,998
8 Claims. (Cl. 156—219)

This invention relates to a method of dielectric embossing and more particularly to the method of dielectrically embossing a conductive element to a thermoplastic material.

Dielectric embossing is based on the phenomenum that certain dielectrics will become heated when subjected to an alternating voltage of several megacycles frequency. In the dielectric embossing art it is conventional practice to fabricate laminated assemblies such as vehicle door trim panels by forming layers of dielectric materials, usually thermoplastic materials, or of fabrics treated with thermoplastic resins, placing the assembly between a pair of dies or electrodes and applying high frequency energy between the electrodes to fuse the various layers together. One of the dies or electrodes usually has such a configuration as to contact the assembly in those areas where it is desired to fuse together the various layers or imprint a design thereon. With this method it has been practical to fabricate substantially complete trim panels consisting of various layers of padding, different colors of thermoplastic covering, and plastic simulated-metal moldings all on the same panel and secured together by a single embossing operation. However, it has not been possible heretofore to include in the above described single operation the securing of metallic ornaments, escutcheon plates or the like to the trim panel.

It is an object of this invention to provide a method of securing metallic elements to a thermoplastic material by dielectric heating. It is a further object of this invention to provide a method of securing a metallic element to a thermoplastic material wherein the metallic element forms a part of the embossing electrode.

The invention is carried out by coating a portion of a metallic element with a thermoplastic and placing the coated portion against a layer of thermoplastic material and fusing together the two thermoplastic portions by dielectric heating. Preferably the metallic element serves as an electrode which supplies the dielectric embossing voltage. The above and other advantages of the invention will be made more apparent from the following specification taken in conjunction with the accompanying drawings.

Figure 1:
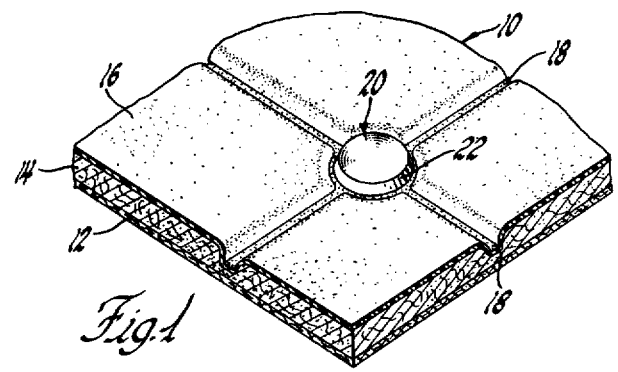
FIGURE 1 is a perspective view of an article which may be produced by the subject invention.

Referring to the drawings, FIGURE 1 depicts an example of the type of article which may be fabricated by use of the method to be described below. The article is a portion of a laminate vehicle door trim panel assembly 10 which comprises a heavy carboard backing 12, a layer of resilient cotton batting 14 impregnated with vinyl resin or other suitable thermoplastic material and the top layer 16 of vinyl sheet material. A pair of intersecting grooves 18 produced by dielectric embossing serve to produce a decorative effect as well as to secure together the three layers of material. A metallic carriage button 20 at the intersection of the grooves 18 is bonded to the vinyl sheet 16 by dielectric embossing.

Figure 2:
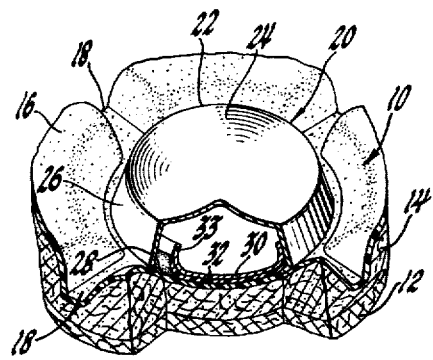
FIGURE 2 is a partly broken away perspective view of a partly metallic ornament secured to an article by the method of the invention.

The structure of the button 20 as illustrated in FIGURE 2 comprises an outer stainless steel shell 22 having a concave top portion 24 and frusto conical sides 26 terminating at the lower edge in an inwardly turned flange 28. An inner metal shell 30 has its lower surface coated with vinyl 32 and is provided with an upturned lip 33 which engages the conical sides 26 of the outer shell 22 so as to be forced downwardly against the inturned flange 28 of the outer shell 22. Hence the coated inner shell 30 is lodged between the flange 28 and sides 26 of the outer shell 22 and the lip 33 of the inner shell 30 makes good electrical contact with the sides 26 of the outer shell 22. Obviously, the button 20 may be fabricated in other ways so long as one surface thereof comprises a thermoplastic material adjacent an electrically conductive backing member.

In the present instance the vinyl coating 32 is applied to the inner shell 30 by first forming the inner shell 30 into the saucer shaped configuration shown, dipping the shell 30 into a vinyl solution and solidifying the coating 32 by drying in an oven. Thereafter the coated inner shell 30 is assembled to the outer shell 22 by crimping the flange 28 against the inner shell. This crimping provides an additional attachment of the vinyl coating 32 to the metal portion of the button 20.

Figure 3:
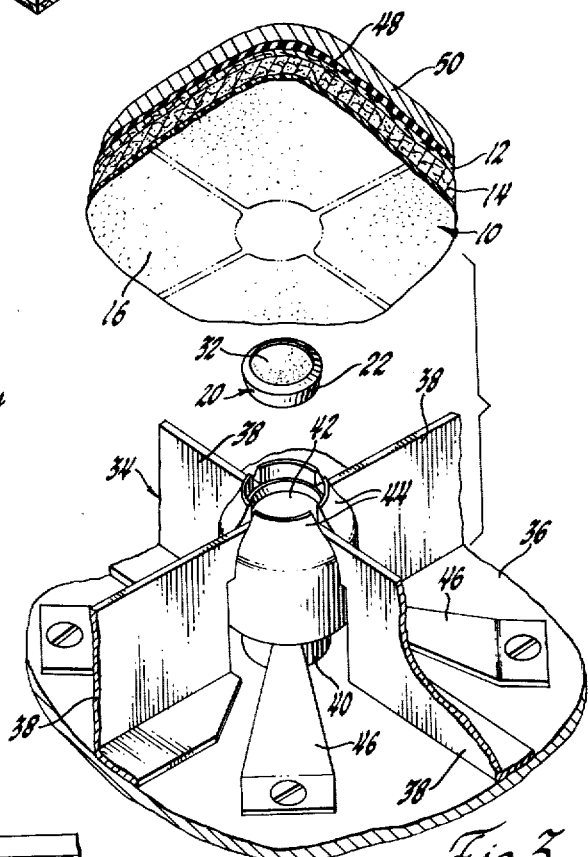
FIGURE 3 is a perspective view of a die construction showing its relationship to the workpiece during assembly according to the invention.

To secure the button 20 to the panel a die assembly 34 such as that shown in FIGURE 3 is preferably used. The die 34 comprises a base plate 36 having a plurality of fin like embossing blades 38 secured thereto in such a manner as to correspond to the grooves 18 in FIGURE 1 or other design which is desired to be impressed into the laminate panel assembly 10. At the intersection of these embossing blades 38 a cylindrical die section 40 is secured to the base plate 36, which section has at its upper end a cup-shaped depression 42 adapted to receive and locate one of the metallic buttons 20. A plurality of retractable diffuser blades 44 surround the cylindrical die section 40 and are spring biased upwardly by several flat springs 46 secured to the base 36 of the die. These retractable diffuser blades 44 help hold the button 20 in its proper position during the embossing operation but have the additional well known function of modifying the electrical field to prevent arcing and consequent burning of the vinyl material. Preferably, the die 34 is used in the position illustrated so that it serves as the lower embossing die and the assembly 10 to be embossed is placed on top of the die. However, should it be desired to use the die as the upper member of the embossing press, the retractible diffuser blades 44 may be formed to frictionally engage the button 20 so that it will not fall out of the die section 40 prior to the embossing operation.

Figure 4:
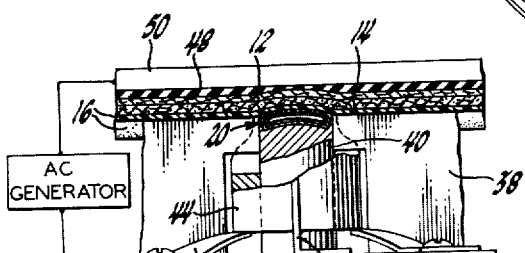
FIGURE 4 is a cross sectional view of the dies and workpiece during the embossing operation.

As shown in FIGURES 3 and 4, to produce the article 10 described above, one of the ornamental buttons 20 is placed in the cupped die section 42 with the vinyl coating 32 facing upwardly. Then the layers of vinyl 16, fabric 14 and cardboard 12 are placed over the die 34 along with a resilient buffer sheet of silicone rubber 48 and the substantially flat upper die 50 is brought down tightly against the assembly to create a pressure of 100 to 500 pounds per square inch on the lower die surfaces. A voltage between 1,200 and 4,000 volts with a frequency between 1 and 100 megacycles is applied to the dies by an A.C. generator. In those areas where the dies 34 and 50 are sufficiently close together to produce an adequate voltage gradient, the thermoplastic materials are heated until they are fused together. The die 34 serves to quench the hot areas of the fabrics by conducting away the heat, thereby cooling the thermoplastic to solidify it. Since the inner shell 30 of the metal button 20 is in electrical contact with the outer shell 22 and the outer shell 22, in turn, is in contact with the cupped die section 42, the inner shell 30 will carry the voltage of the die 34 to effectively become an electrode and actually serve as part of the die. This makes possible the fusing of the coating 32 of the button 20 with the vinyl material 16 of the panel 10 since the inner shell 30 is sufficiently close to the upper die 50 to produce the required voltage gradient.

Figure 5:
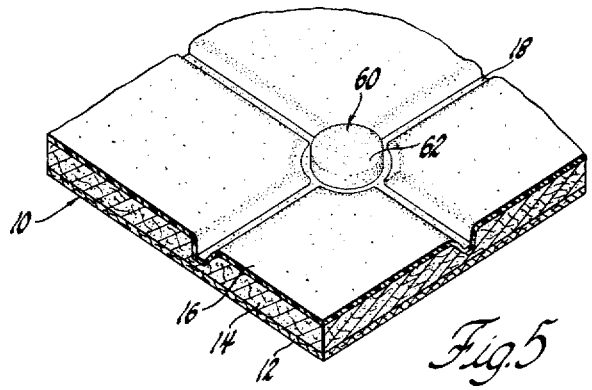
FIGURE 5 is a perspective view of an article which may be produced by the subject invention.

The embodiment of the invention which is used to make the article shown in FIGURE 5 utilizes an ornamental button 60 somewhat similar to that of FIGURE 2 except that it includes a covering 62 of vinyl or other decorative material. The covering 62 may be mechanically secured to the button 60 by clamping between the inner and outer shell 22' and 30' or may be bonded thereto by the method described above for applying vinyl 32 to the inner shell 30. Another alternative would be to use thermoplastic paint.

Figure 6:
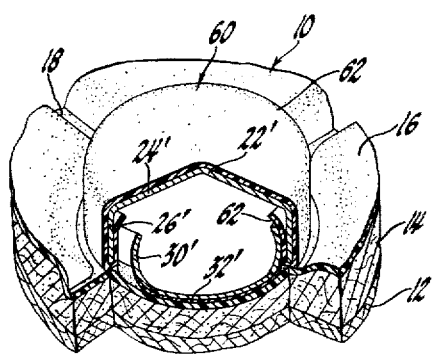
FIGURE 6 is a partly broken away perspective view of a partly metallic ornament secured to an article by the method of the invention.

Specifically FIGURE 6 shows a button 60 having an outer metallic shell 22' with a cylindrical side portion 26' and a flat top portion 24'. A thermoplastic covering 62 extends over the outer surface of the outer shell 22' and the inner surface of the side portion 26'. A vinyl coated inner shell 30' like that of FIGURE 2 is pressed into the outer shell 22' and serves to clamp the covering 62 in place.

The covering 62 will prevent the lower embossing die section 40 (FIG. 4) from making contact with the metallic shell 22' so that a portion of the embossing voltage will appear across the covering 62 between the die 40 and the outer shell 24' and between the outer shell side portion 26' and inner shell 30'. Yet the previously described process is used except that measures must be taken to insure that the heat generated in the covering 62 be removed so that its temperature remain below its softening point. When, as shown here, the amount of dielectric material in the covering 62 is small compared to the combined base material 16, batting 14, and vinyl material 32', the voltage drop across the cover material 62 and the amount of heat generated therein is likewise small. Then the heat generated in the material adjacent the embossing die 40 is removed by conduction to the die provided the die section 40 is in contact with the button 60 in good thermal contact therewith, and that the die section 40 is sufficiently massive to absorb the heat without becoming unduly hot after a series of embossing operations. The covering 62 between the inner and outer shells 22' and 30' is cooled by conduction to both of these shells. Hence a thin covering of dielectric material may be added to the ornamental button providing that the embossing process provides a step of quenching or removing heat from the covering 62.

The vinyl covered button 60 may also be considered as part of the embossing die 40 since the metal shells 22' and 30' are capacitively coupled to the die 40 and to each other thereby becoming "secondary" electrodes for applying the major portion of the embossing voltage to the materials 12, 14 and 16 between the button 60 and the upper die 50.

Figure 7:
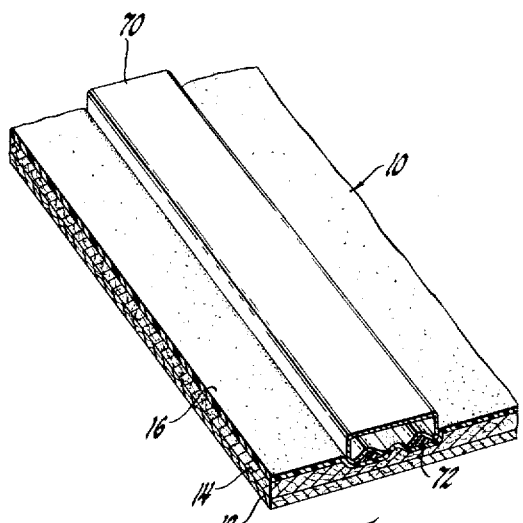
FIGURE 7 is a perspective view of a portion of a trim panel having a molding of channel shaped cross-section with inturned concave flanges on the legs.
Figure 8:
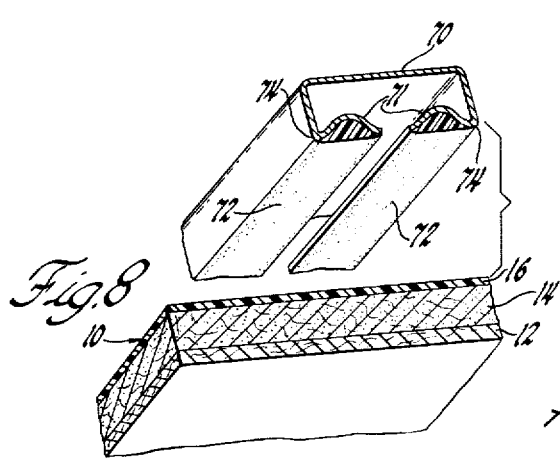
FIGURE 8 is an exploded view of FIGURE 7.

Of course the above described process is by no means limited to ornamental buttons but may be used with any conductive material which may be secured to a suitable thermoplastic portion and which also may become a part of the embossing die or electrode. For example, the ornamental element to be bonded to the trim panel may take the form of a linear molding 70. The molding depicted in FIGURES 7 and 8 has a channel shaped cross-section with inturned concave flanges 71 on the legs. A thermoplastic coating 72 is bonded to the flanges, and then the molding is embossed to the trim panel by the process described above. In cases where it is found to be desirable to use a large mass of thermoplastic material 72, a depending skirt portion or flange 74 is formed along either side of the molding 70 to prevent the fused thermoplastic 72 from running out into the exposed portion of the panel 10.

Thus it is readily seen that the invention makes possible the bonding of metallic elements to a thermoplastic material by dielectric embossing simultaneously with other embossing operations on the same article.

The invention described herein is not limited to the specific embodiments described but rather departures from this disclosure may be made within the spirit of the invention and the scope of the invention is limited only by the following claims.

What is claimed is:

1. A method of securing a decorative metallic element to a thermoplastic base material, comprising the steps of applying a thermoplastic material to the outer surface of a portion of said element, placing the element and the base material in a dielectric heating press having a pair of electrodes, closing the press so that one of said electrodes makes electrical contact with the element to make the latter a part of the electrode and so that the base material contacts the thermoplastic material on the element, and applying a high frequency voltage between said element and the other of said electrodes to heat both of the materials at the contacting surfaces thereof to fuse them together whereby the element is bonded to the base material.

2. A method of securing a decorative metallic element to a thermoplastic base material, comprising the steps of applying a thermoplastic material to the outer surface of a portion of said element, placing the element and the base material in a dielectric heating press having a pair of electrodes, closing the press so that one of said electrodes makes electrical contact with the element to make the latter a part of the electrode and so that the base material contacts the thermoplastic material on the element, applying pressure to the element and base material, and applying a high frequency voltage between said element and the other of said electrodes to heat both of the materials at the contacting surfaces thereof to fuse them together whereby the element is bonded to the base material.

3. A method of securing a decorative metallic element to a thermoplastic base material with a dielectric heating press having a pair of electrodes movable towards each other, one of said electrodes being formed with a portion for accommodating the element, comprising the steps of applying a thermoplastic material to the outer surfaces of a portion of said element, placing the element and the base material between the electrodes with said base material and said material on the element facing each other, aligning said element with said accommodating portion in said one of said electrodes so that upon closing the press the element makes electrical contact with the electrode and becomes a part thereof, closing the press to move the electrodes towards each other so that the base material contacts the thermoplastic material on the element, and applying a high frequency voltage between the element and the other of the electrodes to heat both of the materials at the contacting surfaces thereof to fuse them together whereby the element is bonded to the base material.

4. A method of making a decorative article comprising the steps of covering one outer surface of a decorative metallic element with a thermoplastic sheet, coating a second outer surface of the element with a thermoplastic material, placing said element between a pair of electrodes of a dielectric heating press with the surface having the thermoplastic sheet positioned for contact with one of said electrodes, placing a thermoplastic base sheet in contact with the thermoplastic coating on said second surface of the element, closing said press so that the element and base sheet are compressed between the electrodes, applying a high frequency voltage to the electrodes whereby the element serves as a secondary electrode and the thermostatic coating is fused to the base sheet so as to bond the element to the latter and simultaneously quenching said thermoplastic sheet covering said one outer surface of the element to prevent melting of said sheet.

5. A method of making a decorative article comprising the steps of applying thermoplastic material to the outer surfaces of a decorative metallic element having vertically spaced first and second surface portions, placing said element between a pair of electrodes of a dielectric heating press with the thermoplastic material on the first surface portion contacting one of said electrodes, placing a thermoplastic base sheet in contact with the thermoplastic material on the second surface portion, closing the press so that the element and base sheet are compressed between the electrodes, applying a high frequency voltage to the electrodes whereby the element serves as a secondary electrode and the thermoplastic material on the second surface portion fuses to the base sheet so as to bond the element to the latter, and simultaneously quenching the thermoplastic material on the first surface portion of the element to prevent melting of said thermoplastic material.

6. A method of dielectrically embossing a thermoplastic base material concurrently while securing an electrically conductive decorative element thereto, comprising the steps of applying a thermoplastic material to an outer portion of the element, placing the element in electrical contact with one of a pair of electrodes of a dielectric heating press, placing the base material in contact with the thermoplastic material on the element, closing the press, applying a high frequency voltage between the element and the other of said pair of electrodes to heat both of said materials at the contacting surfaces thereof to fuse them together whereby the element is bonded to the base material, and simultaneously dielectrically embossing the base material.

7. A method of dielectrically embossing a thermoplastic base material concurrently while securing a decorative metallic element thereto, comprising the steps of applying a thermoplastic material to the outer surface of a portion of said element, placing the element and the base material in a dielectric heating press having a pair of electrodes one of which is formed with a plurality of embossing blades, closing the press so that the electrode having the embossing blades makes electrical contact with the element to make the latter a part of the electrode and so that the base material contacts the thermoplastic material on the element, applying a high frequency voltage between said element and the other of said electrodes to heat both of the materials at the contacting surfaces thereof to fuse them together whereby the element is bonded to the base material, and simultaneously dielectrically embossing the base material.

8. A method of securing a decorative electrically conductive element to an article, comprising forming a part of said element of a heat softenable material, placing said element and said article in a dielectric heating press having a pair of electrodes so that upon closing the press said heat softenable material contacts said article and said element makes electrical contact with one of the electrodes of said press, and fusing together said material and said article by the application of high frequency electrical energy between said element and the other of said electrodes whereby the element is bonded to the article.

References Cited in the file of this patent
UNITED STATES PATENTS

| | | |
|---|---|---|
| 2,144,544 | Osborn | Jan. 17, 1939 |
| 2,684,320 | Lyijynen | July 20, 1954 |
| 2,718,485 | Samuely | Sept. 20, 1955 |
| 2,724,884 | Jones | Nov. 29, 1955 |
| 2,988,129 | Kevelin et al. | June 13, 1961 |
| 2,991,216 | Hsu et al. | July 4, 1961 |

UNITED STATES PATENT OFFICE
CERTIFICATE OF CORRECTION

Patent No. 3,107,190            October 15, 1963

Bruce E. Kevelin

It is hereby certified that error appears in the above numbered patent requiring correction and that the said Letters Patent should read as corrected below.

Column 2, line 2, for "carboard" read -- cardboard --; column 5, line 8, for "thermostatic" read -- thermoplastic --

Signed and sealed this 14th day of April 1964.

(SEAL)
Attest:
ERNEST W. SWIDER
Attesting Officer

EDWARD J. BRENNER
Commissioner of Patents